(12) United States Patent
Morris, III et al.

(10) Patent No.: US 7,588,489 B2
(45) Date of Patent: *Sep. 15, 2009

(54) POST CHILL DECONTAMINATION TANK

(75) Inventors: William F. Morris, III, Raleigh, NC (US); Terry A. Wright, Cary, NC (US); Robert E. Cathey, Apex, NC (US)

(73) Assignee: Morris & Associates, Inc., Garner, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/139,941

(22) Filed: Jun. 16, 2008

(65) Prior Publication Data
US 2008/0242207 A1    Oct. 2, 2008

Related U.S. Application Data

(63) Continuation of application No. 11/762,142, filed on Jun. 13, 2007, now Pat. No. 7,470,173.

(60) Provisional application No. 60/813,203, filed on Jun. 13, 2006.

(51) Int. Cl.
*A22B 7/00*    (2006.01)
(52) U.S. Cl. ..................................... 452/173
(58) Field of Classification Search ............... 452/173, 452/81, 114, 120, 123
See application file for complete search history.

(56) References Cited

U.S. PATENT DOCUMENTS

| | | | |
|---|---|---|---|
| 3,097,501 A | 7/1963 | Pappas | |
| 3,250,086 A | 5/1966 | Morris, Jr. | |
| 3,410,101 A | 11/1968 | Morris, Jr. | |
| 4,324,020 A * | 4/1982 | Garwin et al. | 452/12 |
| 4,860,554 A * | 8/1989 | Innes et al. | 62/374 |
| 4,875,344 A * | 10/1989 | Zittel | 62/381 |
| 5,484,615 A * | 1/1996 | Kounev | 426/238 |
| 5,775,986 A * | 7/1998 | Law et al. | 452/141 |
| 5,868,000 A * | 2/1999 | Morris et al. | 62/374 |
| 6,129,626 A * | 10/2000 | Morris et al. | 452/134 |
| 6,214,400 B1 * | 4/2001 | Zittel et al. | 426/509 |
| 6,397,622 B1 * | 6/2002 | Miller et al. | 62/381 |
| 6,497,106 B2 * | 12/2002 | Lang et al. | 62/63 |
| 6,569,482 B2 * | 5/2003 | Schaefer et al. | 426/509 |
| 6,596,846 B2 * | 7/2003 | Peregrino Ferreira et al. | 530/350 |
| 6,865,895 B2 * | 3/2005 | Bass | 62/64 |
| 7,281,384 B2 | 10/2007 | Morris, III | |
| 7,288,274 B2 | 10/2007 | Hilgren et al. | |

OTHER PUBLICATIONS

Dip Tank, by Ecolab, Aug. 25, 2005.

* cited by examiner

*Primary Examiner*—Thomas Price
(74) *Attorney, Agent, or Firm*—Thomas, Kayden, Horstemeyer & Risley, LLP

(57) ABSTRACT

The post chill decontamination tank assembly 24 usually is positioned at the exit end of a chiller 10 of a poultry processing line. Eviscerated birds fall into the decontamination tank 25 and the paddles 42A-42D of the paddle assembly 34 revolve in the tank about the axis 37 and collect and lift the birds through the liquid and discharge the birds from the tank. An antimicrobial is added to the liquid for treating the exposed surfaces of the birds.

21 Claims, 7 Drawing Sheets

POST CHILL DECONTAMINATION TANK

CROSS REFERENCE TO RELATED APPLICATION

Applicant claims the benefit of provisional application 60/813,203 filed in the U.S. Patent & Trademark Office on Jun. 13, 2006, and this application is a continuation of utility application Ser. No. 11/762,142 filed on Jun. 13, 2007 now U.S. Pat. No. 7,470,173.

FIELD OF THE INVENTION

This invention concerns the decontamination of eviscerated poultry carcasses in a poultry processing system after the poultry carcasses have been chilled in a liquid chiller.

BACKGROUND OF THE INVENTION

In the processing of poultry, particularly chickens, the industry has had to deal with problems concerning bacterial contamination of the processed birds. During the process of dressing poultry, the birds are susceptible to contamination, self-inflicted and cross-contamination by the handling of the mass of birds in a typical day. The bacteria tend to cling to and grow on the exposed surfaces of the birds, including in the feather follicles. The problem has the potential of intensifying at the stage where the birds are being chilled in a liquid chiller, where the birds are chilled from approximately normal body temperature down to the mid thirty degrees Fahrenheit.

Some of the common pathogenic bacteria found in poultry are *salmonella*, herpes, *e. coli*, and others. While antiseptic additives may be included in the liquid of the chiller for a significant reduction of the bacteria, there is a hazard that bacteria may be passed with the birds on to the market place where the dressed products are distributed to the public. Fortunately, poultry products typically are cooked thoroughly and the bacteria are eradicated during the cooking process. However, there still is a hazard of the bacteria may be passed on to the public.

While the addition of antibacterial substances to the liquid in the chiller have had success in reducing the surface bacteria on poultry carcasses, most procedures are not successful in removing all pathogenic bacteria from the contaminated carcasses. For example, it is more difficult to vigorously apply the liquid and its antibacterial contents to the cavities of the birds and to the feather follicles of the birds and these areas of the birds might retain more bacteria than other portions of the birds.

As disclosed in U.S. Patent Publication US 2006/0225439 A1, water jets may be directed into the chiller tank at locations where birds have accumulated and the streams of water bear antibacterial additives that more vigorously "wash" the birds. However, if the water jets are not used or do not properly contact the birds, the contamination of the birds may not be fully reduced by the washing action from the water jets.

Because of the need to reduce the temperature of the birds while in the chiller tank, the birds require a long dwell time in the chilled liquid. Because of the long dwell time the concentration of the antibacterial substances in the liquid cannot be very high so as to avoid damaging the surfaces of the birds.

Efforts have been made to reduce the bacteria count in poultry products after the products leave the chiller. For example, there are post chill decontamination tanks that are positioned behind the chiller and the birds are dropped into the tank for treatment of its liquid. The birds are retained in this tank for a short dwell time and the liquid would include an increased concentration of decontamination substances.

Once the birds have been dropped into the prior art decontamination tank, a conveyor belt brings the birds up on a sloped incline, from the bottom of the tank up to and over the exit end of the tank and deposits the birds on a continuing conveyance to the next processing station. While this process has met with some success, the equipment requires a large footprint and there may be a lack of consistency of dwelling time of the birds in the decontamination tank, where some birds are advanced on time while other birds have longer dwell times that are unnecessary and which may impede the dwell time of a later bird. Also, there is some lack of vigorous physical contact of the decontamination fluids with the cavities of the birds and with the feather follicles of the birds where the concentration of bacteria is more prevalent.

It is to these problems that this invention is directed.

SUMMARY OF THE INVENTION

Briefly described, the present invention comprises a post chill decontamination tank assembly for placement in a poultry processing line, preferably adjacent the bird discharge end of a poultry chiller. The post chill decontamination tank is used to treat and reduce the microbial contamination on the surfaces of the birds after the birds are removed from the chiller. The decontamination tank is provided with mechanisms to assure a controlled treatment time for the birds in the liquid of the tank and to remove the birds from the tank after treatment at the proper dwell time. The process may include the application of liquid to the birds that has a higher concentration of chemicals than in the chiller. Typically, this liquid would include an increased concentration of decontamination substances, including chlorine, ozone, other common disinfectants or any of a number of proprietary treatment substances, or a combination of these, possibly in combination with suitable acids, caustics or buffers to control the pH of the solution. The more concentrated liquid may be further augmented by mechanical systems such as jets of liquid directed against the birds and movement of the birds through the liquid, or other means to enhance the liquid and mechanical agitation of the birds, with liquid contact with the efficacy of the biological agent.

The post chill decontamination tank may be equipped with a control system for maintaining the chemical environment in the tank at the condition desired for effective bacterial decontamination. Also, since the post chill tank is much smaller than the chill tank, the more expensive chemicals may be used on a more economical basis in the post chill tank.

The post chill decontamination tank assembly includes the tank for holding liquid and the tank including the upper opening means for receiving poultry carcasses in the tank and for discharging the poultry carcasses from the tank. A paddle assembly that includes a plurality of paddles is mounted in the tank and the paddles revolve about a central axis within the tank with the paddles extending at different angles about the central axis.

Power means, such as a drive motor, is connected to the paddle assembly for revolving the paddles about the central axis in the tank and in sequence past the opening means of the tank for urging the poultry carcasses in sequence about the tank and toward the opening means. Preferably, the paddles are sloped toward the opening means when reaching the opening means for urging the carcasses out of the tank.

The post chill decontamination assembly may also include the paddles having a wiping edge and a gathering edge sloped away from the wiping edge. The slope of the paddles helps gather the birds on each paddle as the plurality of paddles revolve in the tank. The wiping edge is movable adjacent the exit wall of the tank and across the opening means of the tank to urge the poultry carcasses through the opening means.

The wiping edges of the paddles may be rectilinear or of other configuration and may be juxtaposed the rear wall of the tank so as to gather the birds between the paddles and the facing surface of the rear wall of the tank, so that when the paddles reach the opening means, the birds tumble under the influence of gravity out of the tank to an awaiting conveyor or other receiving device.

The plurality of paddles revolve in sequence past the opening means so that when the birds are progressively dropped from the chiller into the post chill decontamination tank, and the paddles gather the birds in the order in which they were deposited into the post chill decontamination tank and progressively move them toward the opening means for discharge. This causes the birds to have approximately the same dwell times in the decontamination tank.

The paddles of the decontamination tank may be formed with openings extending therethrough for the passage of the liquid of the tank. The passages enhance the flow of liquid about the birds as the birds are urged by the paddles through the liquid. This tends to enhance the removal of the bacteria from the feather follicles and from the cavities of the birds and the decontamination liquid would have more vigorous access to the bacteria at the exposed surfaces of the birds.

While the rate of rotation of the paddles in the tank may be varied, the desired rate of rotation for the embodiment of the tank in FIG. 1 usually is between one-half and one revolution per minute. However, the rate of revolutions may be modified in accordance with the conditions of the tank, such as the volume of liquid in the tank, the density of the birds in the tank, and concentration of the decontamination liquid.

In one embodiment of the invention, a partition is used to separate the tank into two sections, one being occupied by the rotary paddles and the other forming an entrance chamber for the birds as they are initially deposited into the tank. Jets of recirculating decontamination liquid may be used to control the movements of the birds in the entrance chamber portion of the tank, making sure that the birds are timely moved into engagement with the paddles while applying antibacterial liquid to the exposed surfaces of the birds.

Another embodiment of the invention includes an auger positioned in an entrance chamber adjacent the paddle chamber so that the birds are delivered first to the auger, and the auger then progressively moves the birds toward the paddles, assuring that the birds have a first in, first out treatment process.

In another embodiment of the invention, two rotary paddle assemblies may be used, with the rotary paddles operating in different chambers of the tank. The first rotary paddle assembly rotates so as to gather the birds in sequence and begin the process of decontamination and dropping the birds into the second tank where a second rotary paddle assembly operates in a similar manner. Optionally, the first and second rotary paddle assemblies can rotate in opposite directions so as to assure proper sequential handling of the birds during the decontamination process.

Thus, it is an object of this invention to provide an improved post chill decontamination tank for the application of antimicrobial substances to the birds in a poultry processing system.

Another object of this invention is to provide an improved decontamination tank assembly that provides better control of the movement of birds through the tank for a first in, first out system where the birds spend the same dwell time.

Other objects, features, and advantages of the present invention will become apparent upon reading the following specification, when taken in conjunction with the accompanying drawings.

DETAILED DISCLOSURE OF THE INVENTION

Figure 1:
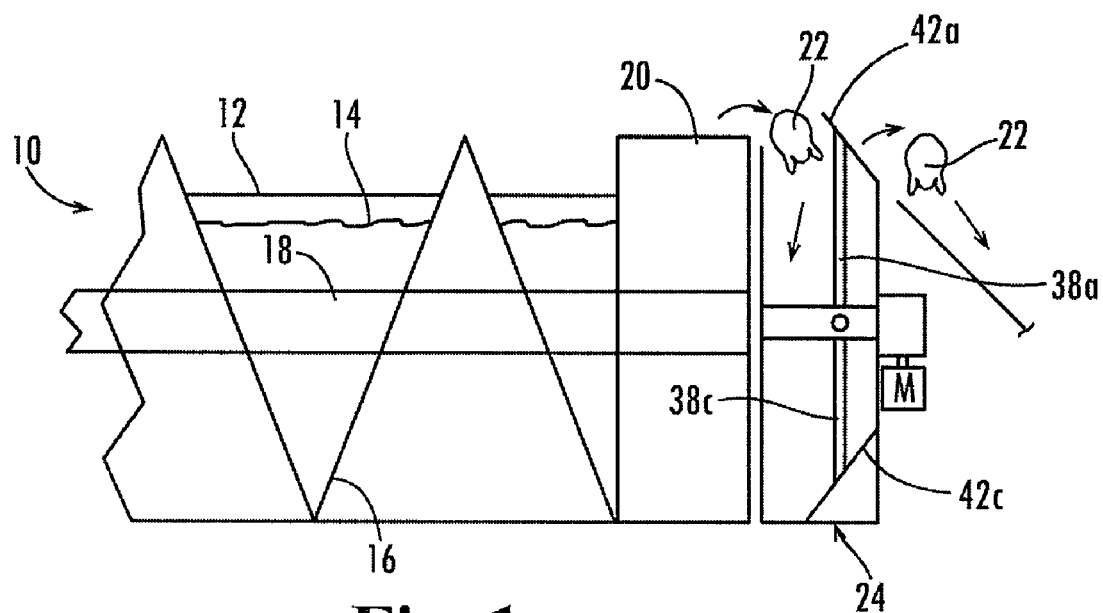
FIG. 1 is a partial side elevational view of a poultry chiller, its unloader, and the post chill decontamination tank, showing the post chill decontamination tank positioned at the exit end of the chiller.

As shown in FIG. 1, a chiller 10 comprises an open top semi-circular tank 12 that is capable of holding water up to the level 14. An auger 16 or other device is mounted in the tank 12 to move the birds 22 along the length of the tank. The auger 16 is rotatable about its axial shaft 18 so as to urge dressed poultry carcasses, (sometimes herein "birds") from an entry end toward the unloader 20. The unloader lifts the birds from the water and discharges the birds to the next equipment. This is shown by bird 22. The birds drop into the post chill decontamination tank 24. The chiller 10 and unloader 20 may be of typical prior art construction.

Figure 2:
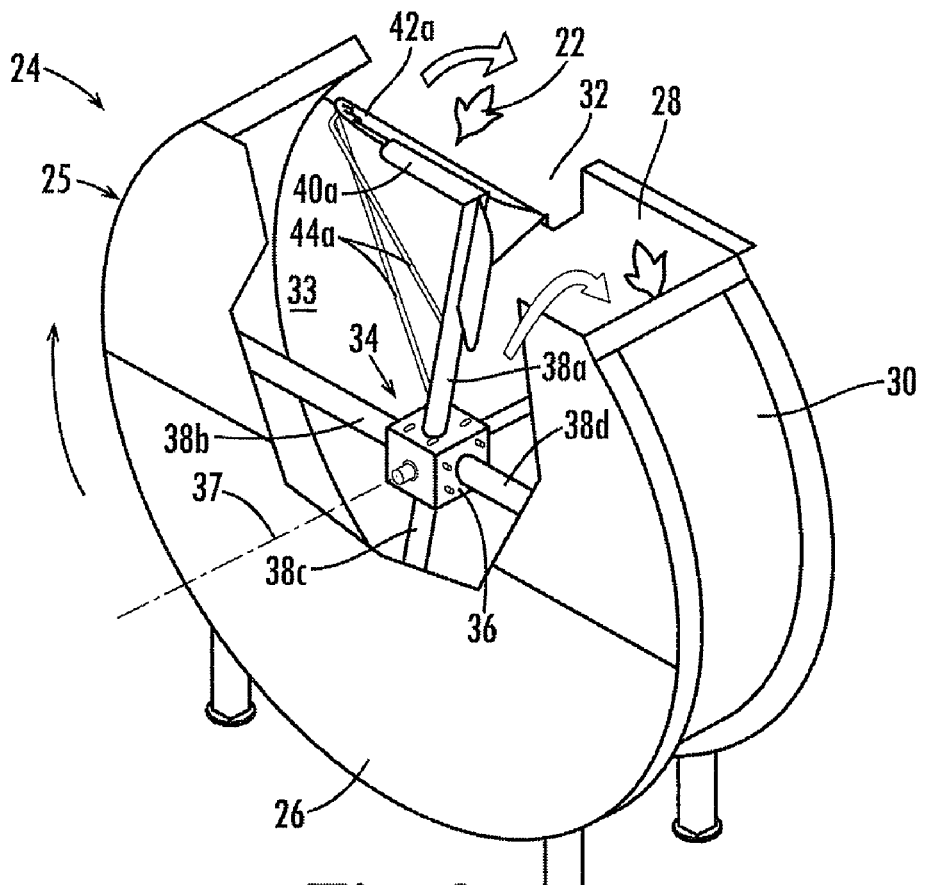
FIG. 2 is a prospective view of the post chill decontamination tank.

FIG. 2 illustrates the post chill decontamination tank assembly 24. The assembly includes a tank 25 that includes an upright entrance wall 26, an opposing upright exit wall 28, and a semi-circular perimeter wall 30 that extends between the entrance wall 26 and the exit wall 28. The walls of the tank define a paddle chamber 33 with an upper opening means or upwardly positioned opening 32 that is formed in the upper perimeter of the tank. Suitable support legs are mounted to the lower portion of the tank, and a paddle assembly 34 is positioned in the tank 25.

Figure 3:
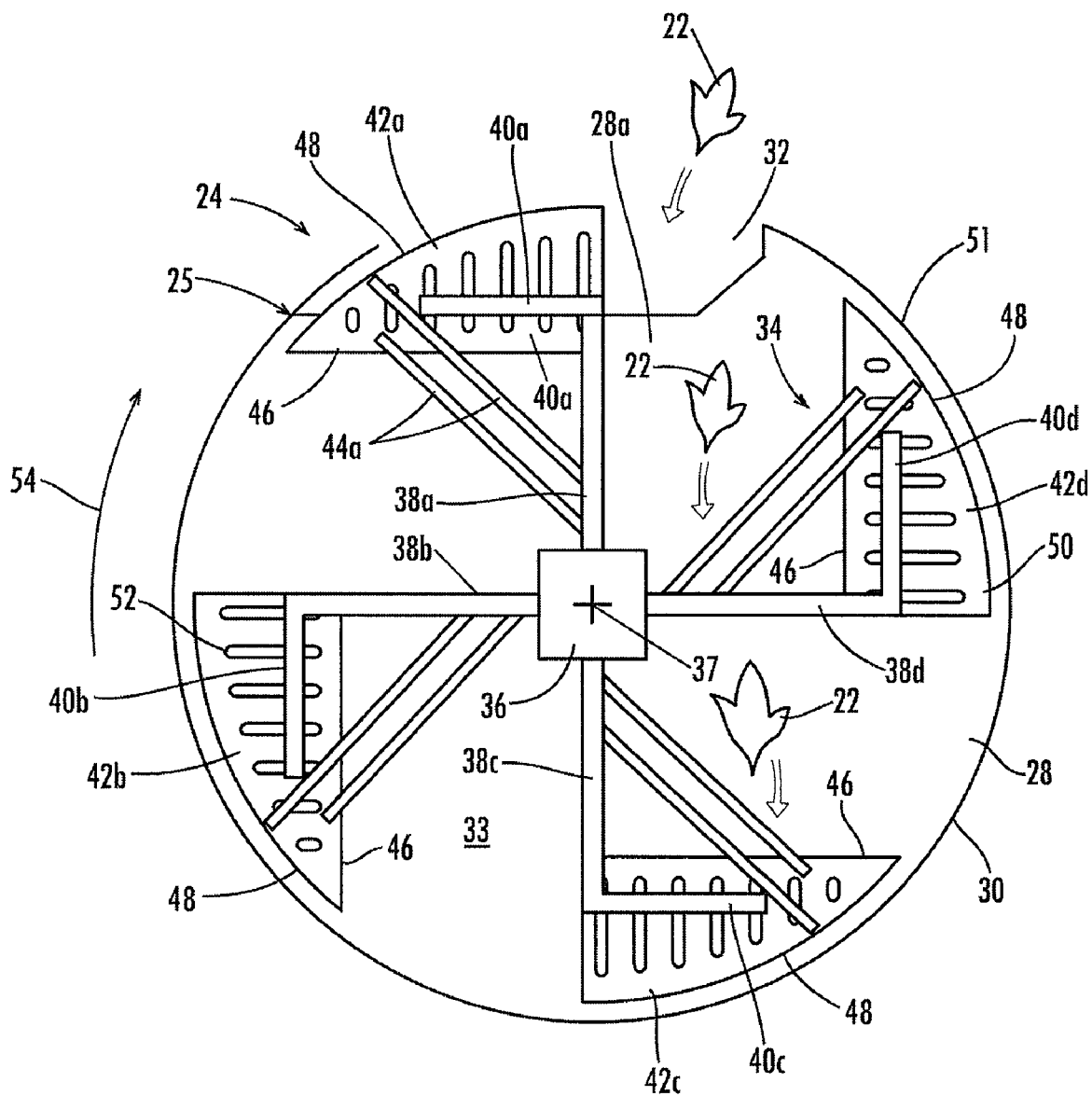
FIG. 3 is a front cross-sectional view of the post chill decontamination tank.
Figure 4:
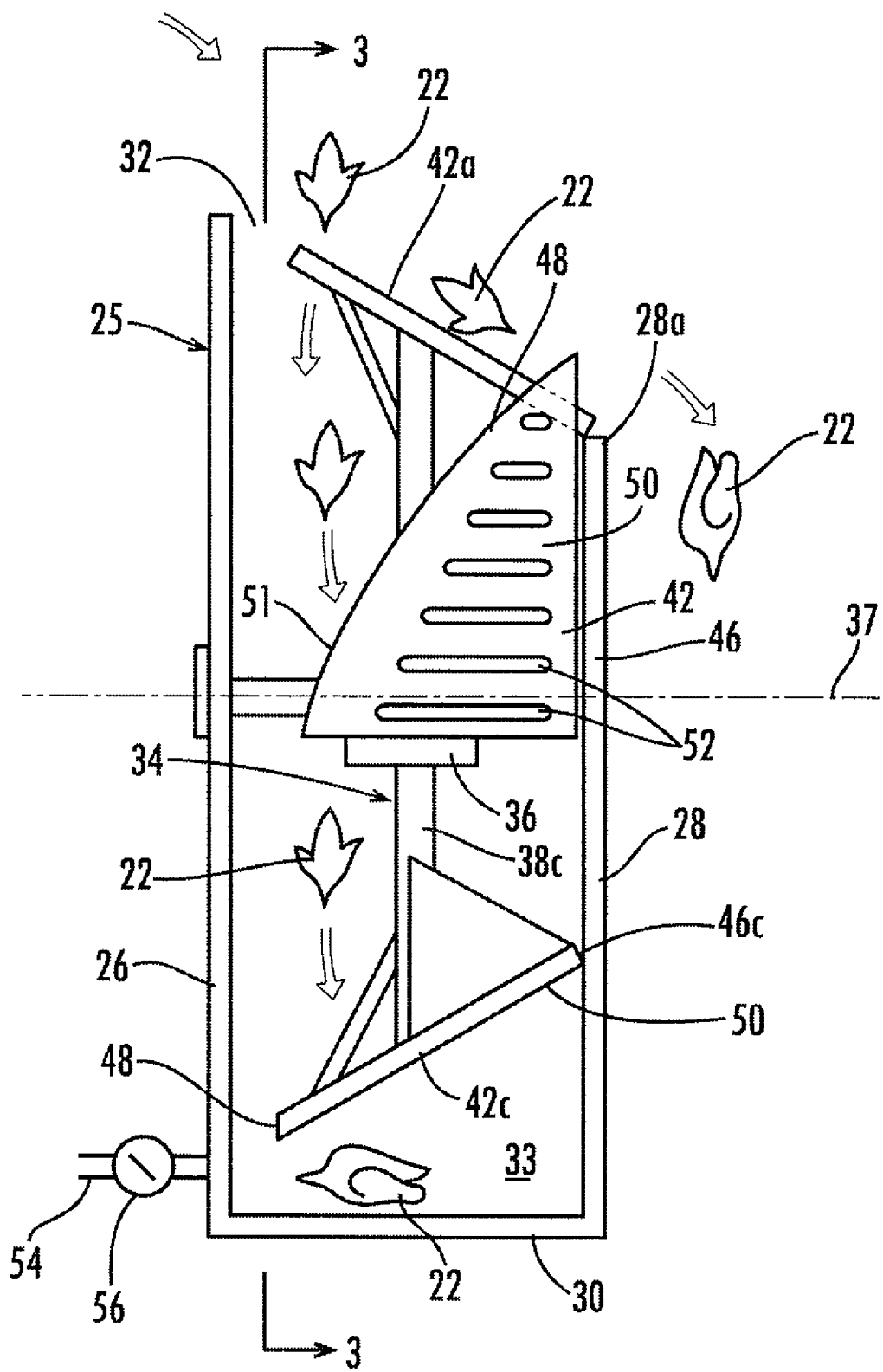
FIG. 4 is a side cross-sectional view of the post chill decontamination tank of FIG. 3.

FIG. 3 shows a cross section of the tank 25 and its paddles, looking through the paddles toward the inside surface of the upright exit wall 28, taken along lines 3-3 of FIG. 4. Paddle assembly 34 includes equally spaced paddles 42a, 42b, 42c and 42d. A hub 36 is positioned at a central axis 37 within the paddle chamber 33 of the tank and support arms 38, such as arms 38A, 38B, 38C and 38D radiate outwardly from hub 36. There may be more or fewer of the paddles and their radiating support arms, as may be desired. Support arms 38A-38D include lateral extensions, such as lateral extension 40A of radiating support arm 38A. The paddles, such as paddle 42A, are mounted on and supported by lateral extensions, such as lateral extension 40A. One or more support bars, such as support bars 44A may be extended between the radiating support arms and the paddles for extra support of the paddles.

In the embodiments illustrated, there are four paddles arranged at 90° intervals about the central axis 37. However, other numbers and spacing of the paddles may be used as desired. It is preferred that the paddles be arranged at equal angles about the central axis 37 to provide equal spaces between the paddles.

Figure 5:
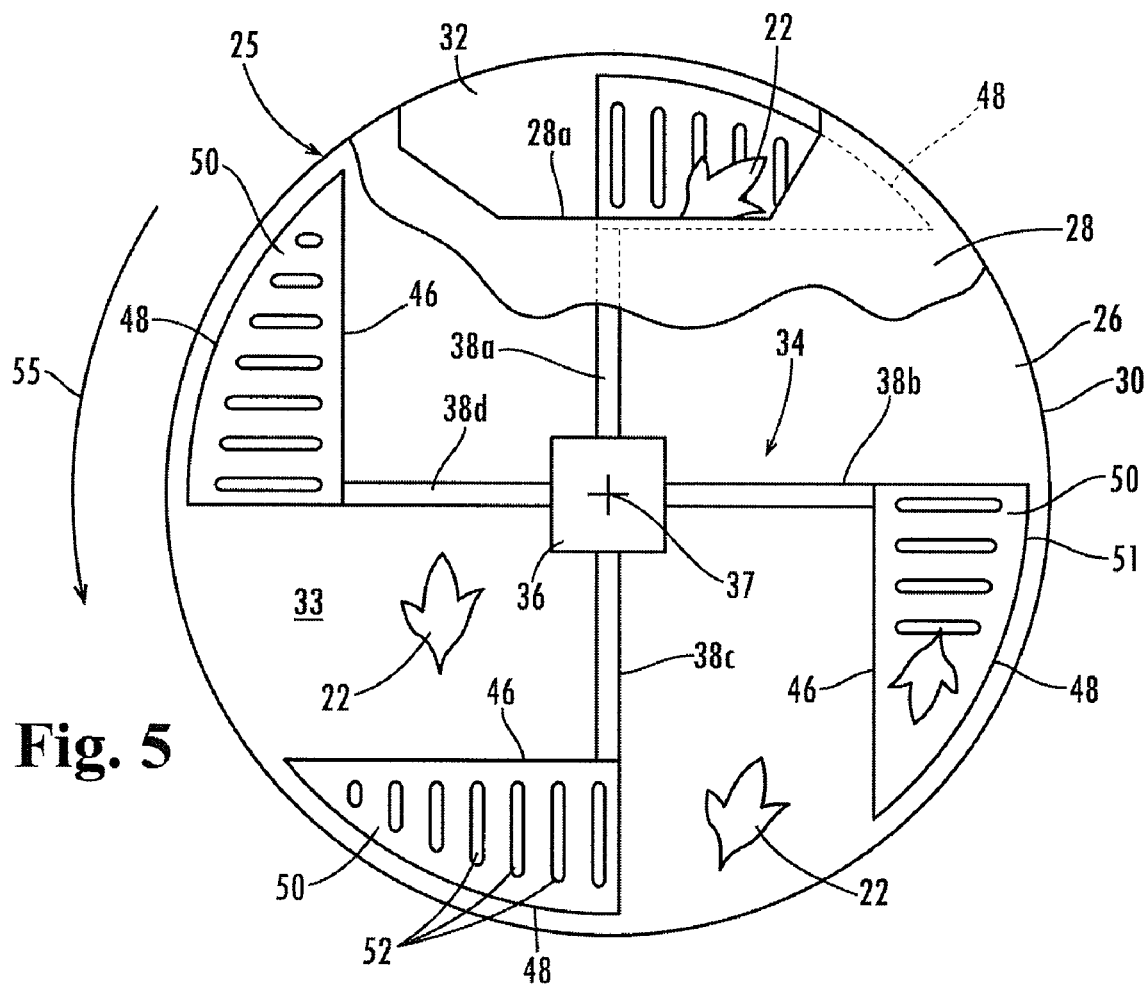
FIG. 5 is a front view of the post chill decontamination tank, showing the opposite side of FIG. 3.

FIG. 5 shows a cross section of the tank 25 and its paddles, similar to FIG. 3, but showing the exit wall broken away and looking in the opposite direction through the paddles toward the inside surface of the upright entrance wall 28. As shown in FIG. 5, paddles 42A-42D are similarly shaped, each having a wiping edge 46 and a gathering edge 48. The wiping edge may be in sliding engagement with or juxtaposed the facing surface of the upright exit wall 28. As best shown in FIG. 4, the paddle face 50 is sloped rearwardly and radially outwardly from the wiping edge 46 toward the gathering edge 48. The wiping edge 46C is juxtaposed the upright exit wall 28, with the face 50 of the paddle 42C sloped radially downwardly and rearwardly toward the gathering edge 48. This orientation tends to gather the birds 22 on the face of the paddle adjacent the upright exit wall 28 as the paddle assembly revolves in the direction indicated by arrows 54 and 55. When the paddles are rotated to the uppermost position, as shown by paddle 42A in FIGS. 3-6, the birds 22 tend to move under the influence of gravity over the upper edge 28A of the upright exit wall 28, to fall to a subsequent process.

Preferably, openings such as openings 52 are formed in the paddles 42A-42D, allowing some of the liquid in the tank 25 to pass through the paddles in response to the movement of the paddles through the liquid. This tends to cause the liquid to pass about the birds gathered on the paddles, washing the birds with the antimicrobial liquid of the tank. Also, the openings 52 in the paddles 42 provide easier passage of the paddles through the water.

As shown in FIGS. 3-6, when the paddles 42A-42D approach the upwardly positioned opening 32, the wiping edge 46 of the paddles will approach a horizontal attitude, generally parallel to the horizontal edge of the upwardly positioned opening 32 and then move upwardly about the opening 32. The birds that are captured by the paddle 42A will then slide under the influence of gravity off the face 50 of the paddle.

Figure 6:
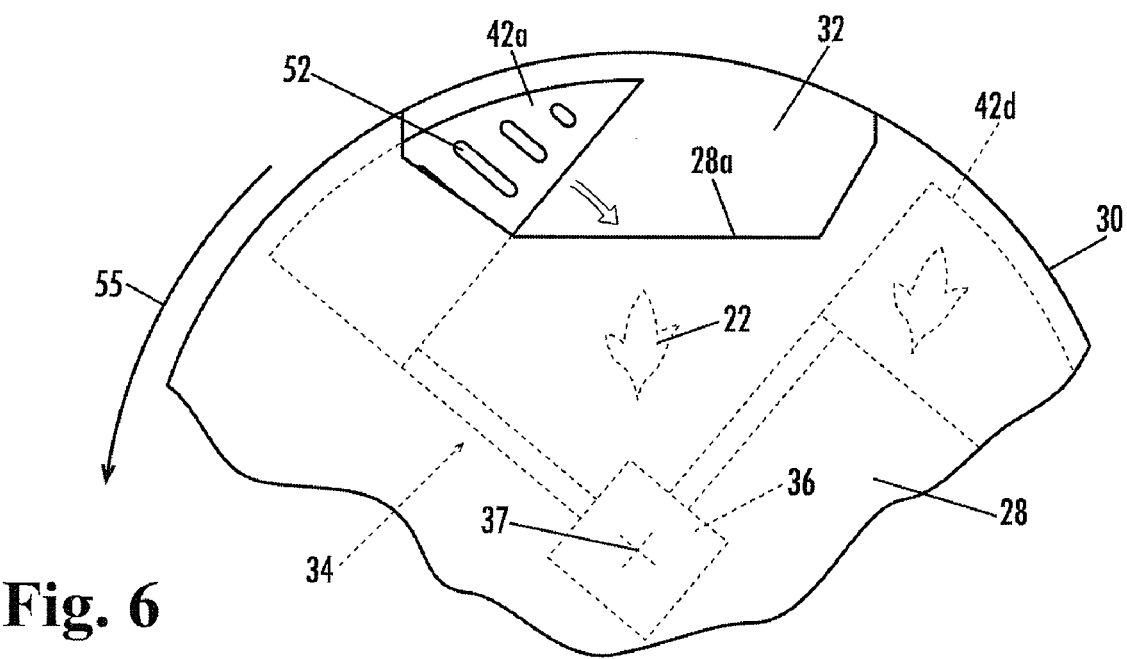
FIG. 6 is a detailed view of the paddles, showing how a paddle discharges a bird from the tank.

FIG. 6 shows paddle 42A after discharging its load of birds 22 and beginning to move out of the upwardly positioned opening 32 of the tank, with next adjacent paddle 42B approaching the opening 32.

The birds that are received from the unloader 20 of the chiller 10 will be dropped into the upwardly positioned opening 32. Generally, the birds are dropped adjacent the upright entrance wall 26 that is spaced remotely from the wiping edges 46 of the paddles where there is more space for the birds to freely drop into the liquid within the tank, as shown in FIG. 4. Typically, the birds are dense enough so as to generally sink within the liquid of the tank, approaching the lower portion of the semi-circular wall 30. The oncoming paddles continually sweep the lower portion of the tank, with the arcuate edges 51 of the paddles sweeping adjacent the semi-circular perimeter wall 30. This tends to capture the birds, and begin movement of the birds in an arcuate path from the bottom of the tank to the upwardly positioned opening 32. As previously stated, the birds are discharged from the tank when the wiping edge 46 begins to pass the horizontal edge of the upright exit wall 28.

Since the paddles 42A and 42D are arranged at equal angles about the central axis 37, the paddles will move in equally spaced timed relationship across the lower portion of the tank 25, capturing the birds at the bottom of the tank and moving the birds progressively, arcuately upwardly to the upwardly positioned opening 32, with the first birds being engaged by a first paddle, and the subsequent birds being engaged by subsequent paddles, so that all of the birds tend to have a substantially equal dwell time in the liquid of the tank. This assures that the turbulence of the birds being moved through the water by the paddle assembly, with the water passing about the birds and through the openings 52 of the paddles causes enough turbulence to generally remove or diminish any layers of water about the birds, allowing the liquid of the tank to circulate adjacent the exposed surfaces of the birds, thereby having an opportunity to engage the bacteria carried by the birds.

The liquid in the tank 25 may be recirculated through a filter, a chiller, additional liquid can be added, and replacement antimicrobial substance can be progressively added to the liquid, if desired. As shown in FIG. 4, a conduit system 54 with a control valve 56 may be used for this purpose. Also, the conduit system is to be placed adjacent a position where the incoming liquid that bears a high concentration of antimicrobial is likely to engage the birds being handled by the paddles. Since the birds tend to be moved by the motion of the paddles and the surrounding liquid toward the upright exit wall 28, the conduit system preferably is directed toward that position, thereby providing turbulence of the antimicrobial bearing liquid to the birds.

Figure 7:
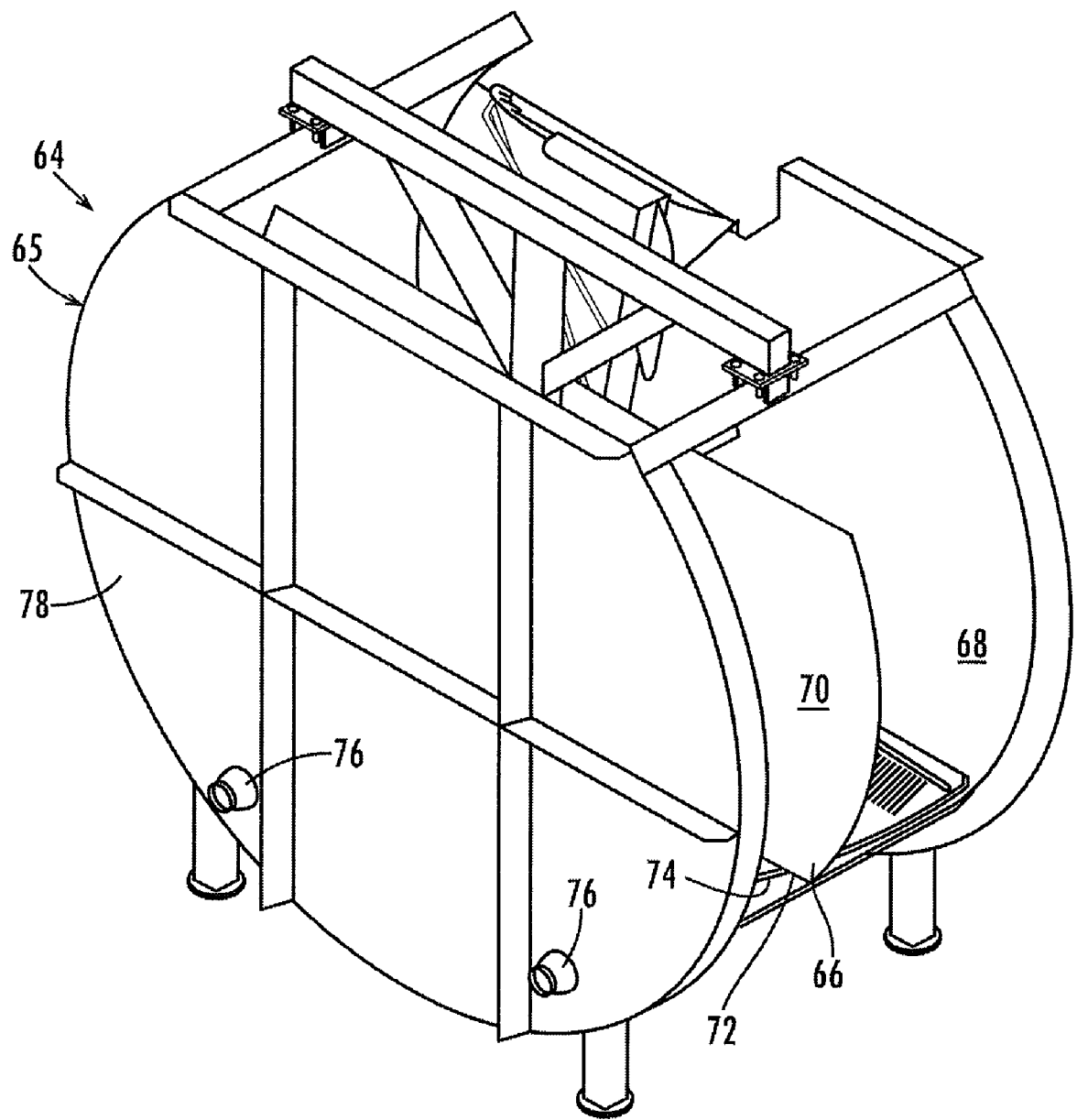
FIG. 7 is a perspective view, similar to FIG. 2, but showing a modified form of the invention, including an internal wall that separates the tank into two sections.

FIG. 7 shows a second embodiment of the invention. The post chill decontamination tank assembly 64 includes a tank 65 that is similar to the tank 25 of FIG. 1, but is of double width and includes a partition 66 that divides the tank in halves, with a paddle chamber 68 and a bird entrance chamber 70. The birds are allowed to drop from the bird unloader into the entrance chamber 70, and the density of the birds and the downward velocity of the birds tend to cause the birds to sink toward the bottom of the tank. The partition 66 has a lower edge 72 that is raised from the bottom of the tank, forming a lower passage 74 beneath the partition. Water jets 76 direct liquid through the upright entrance wall 78 and below the lower edge of partition 70, causing the liquid within the tank 65 to circulate downwardly in the entrance chamber 70, down and about the lower edge 72 of the partition 66 and into the paddle chamber 68 where the paddles revolve in the manner disclosed in FIGS. 1-6. This assures that the birds will move at a predicted rate from the entrance chamber 70 into the paddle chamber 68. Once the birds reach the paddle chamber 68, they are engaged by the revolving paddles and are handled as described above. This arrangement provides additional dwell time of the birds in the tank while retaining a predicted dwell time of each bird. The larger tank with more liquid enables more birds to be passed through the tank in a given interval of time. The revolutions of the paddles can be increased or otherwise adjusted to achieve the desired dwell time of the birds in the liquid.

While the water jets 76 function to move the birds from the entrance chamber to the paddle chamber beneath the lower edge 72 of the partition 66, an additional amount of antimicrobial substance can be added to the streams emitted by the water jets, thereby washing the birds with the antimicrobial as the birds are engaged by the jets.

Figure 8:
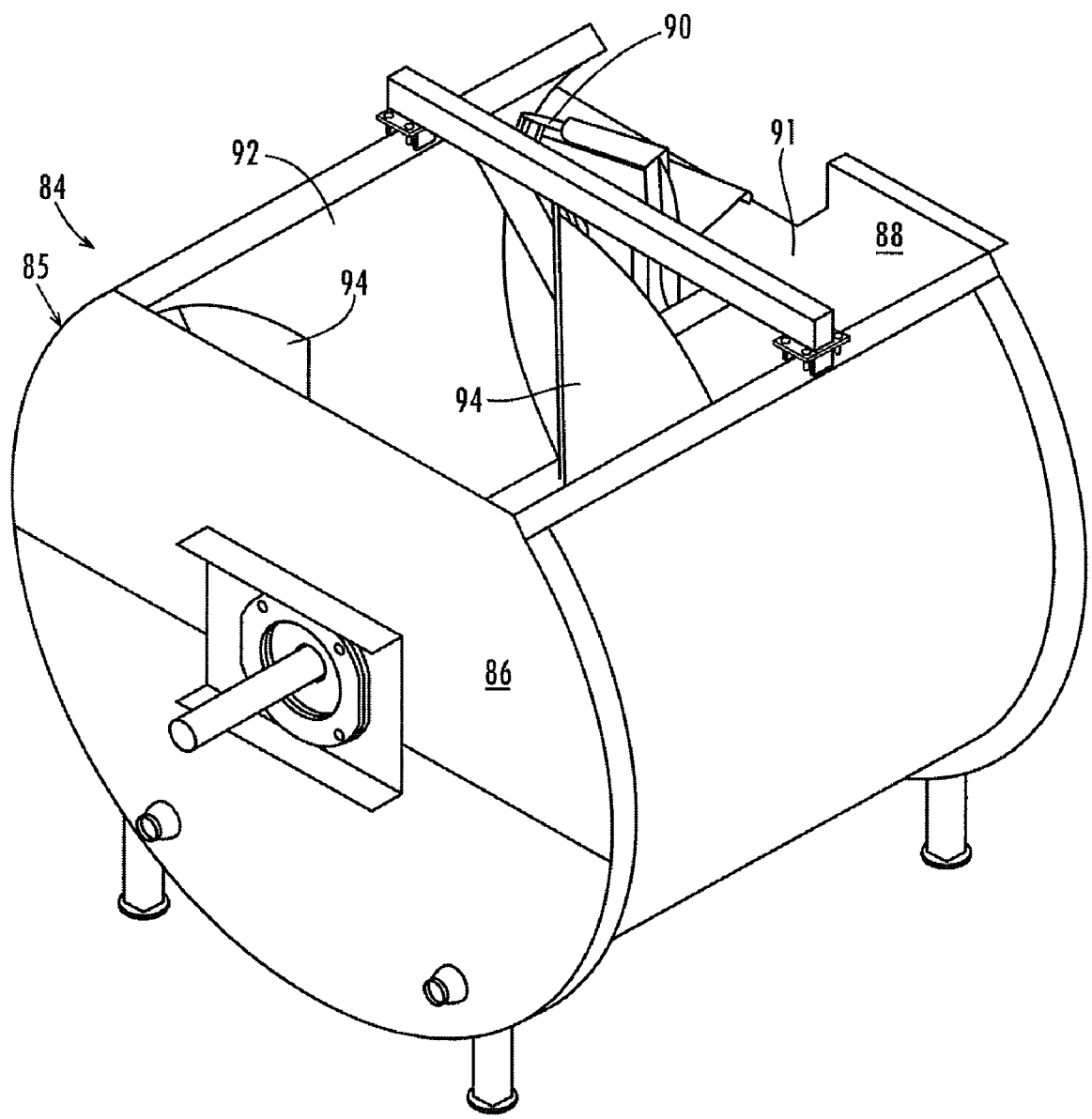
FIG. 8 is a perspective view, similar to FIGS. 2 and 7, but showing an enlarged tank with an auger that feeds the birds in sequence to the paddles.

FIG. 8 shows another embodiment of the invention wherein the post chill decontamination tank assembly 84 includes a tank 85 that is of larger breadth, with the upright entrance wall 86 spaced further away from the opposed upright exit wall 88. Paddle assembly 90 is operable in paddle chamber 91 as described in the previous embodiments. This provides an entrance chamber 92 adjacent the paddle chamber 91 and an auger 94 is positioned within the entrance chamber 92. The birds are dropped in the entrance chamber at a predetermined location along the length of the auger 94 so that the birds are received and are moved in segments along the length of the auger blade toward the paddle assembly 90. Again, this controls the dwell time of the birds in the tank 85 so that the dwell time is approximately the same for all birds moving through the tank.

Figure 9:
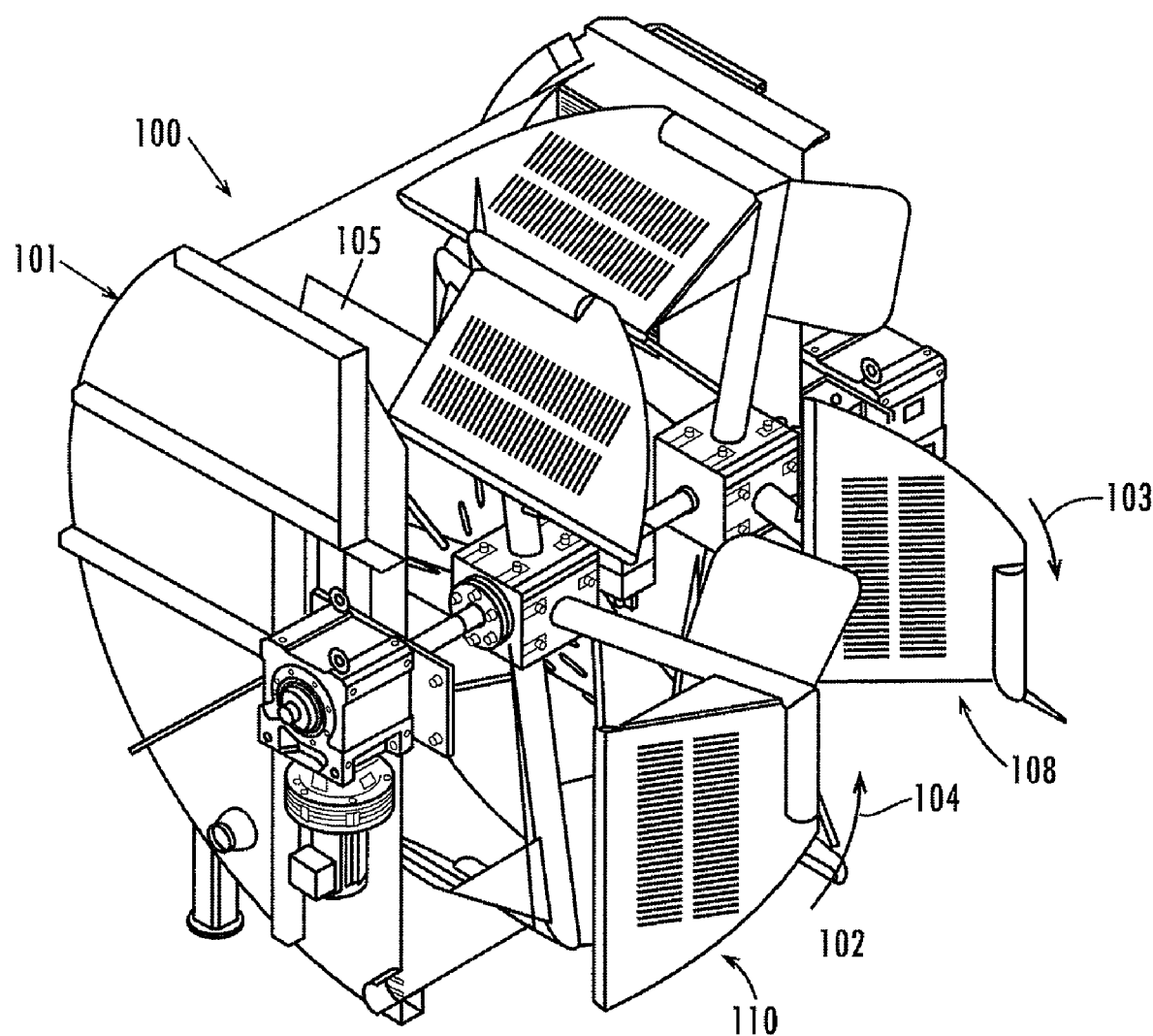
FIG. 9 is a perspective view, similar to FIGS. 2, 7 and 8, but showing the post chill decontamination tank having two sets of paddles that rotate in opposite directions.

FIG. 9 shows yet another embodiment of the invention that includes a post chill decontamination tank assembly 100 that includes a tank 101 with a pair of paddle assemblies 108 and 110 positioned therein. The paddle assemblies function as described in connection with FIGS. 1-6, but the paddle assemblies may be constructed to rotate in opposite directions as indicated by arrows 103 and 104. An internal partition 105 separates the tank into two compartments, with the paddle assembly 108 on one side of the partition and the paddle assembly 110 on the other side of the partition. The birds dropped into the portion of the tank where the paddle assembly 108 is positioned will be progressively moved as previously described, and the paddle will lift the birds over the partition 105 into the chamber of the second paddle assembly 110. The second paddle assembly rotates in the opposite direction but performs substantially the same function as the first paddle assembly, by progressively moving the birds in an arcuate path upwardly so that the birds are discharged continually, on a first in, first out relationship.

The use of the double paddle arrangement that moves in opposite directions provides additional turbulence to the birds, provides a longer path of movement, and allows the paddles to operate at a higher rotary velocity. All of this adds up to additional turbulence about the birds and more thorough contact of the antimicrobial with the surfaces of the birds.

Water jets and recirculating water conduits can be utilized with all of the embodiments of the invention, thereby providing more turbulence of the antimicrobial liquid about the birds, and controlling the movements of the birds within the liquid of the tank.

Although preferred embodiments of the invention have been disclosed in detail herein, it will be obvious to those skilled in the art that variations and modifications of the disclosed embodiment can be made without departing from the spirit and scope of the invention as set forth in the following claims.

What is claimed is:

1. A post chill decontamination tank assembly for decontaminating poultry carcasses for positioning at a carcass discharge end of a poultry chiller, said post chill decontamination tank assembly comprising:

a tank for receiving the poultry carcasses from the poultry chiller, said tank including an entrance wall, an exit wall opposed to said entrance wall, and a semicylindrical perimeter wall extending between said entrance wall and said exit wall and defining a chamber for containing a decontamination solution, said tank including a partition positioned between said entrance wall and said exit wall dividing said tank into a bird entrance chamber and a paddle chamber, said partition including a lower edge positioned above the lower portion of said tank to allow the poultry carcasses to pass from said entrance chamber to said paddle chamber, an upwardly positioned opening means including an entrance space for receiving the poultry carcasses from the poultry chiller into said bird entrance chamber of said tank and a discharge space for discharging the poultry carcasses from said paddle chamber, a paddle assembly including a plurality of paddles mounted in said paddle chamber about a central axis and positioned at different angles about the central axis, power means connected to said paddle assembly for revolving said plurality of paddles in unison about the central axis in said tank, said paddles configured for gathering the poultry carcasses in said paddle chamber and discharging the gathered poultry carcasses from said paddle chamber as said plurality of paddles revolve in said tank.

2. The post chill decontamination tank assembly of claim 1 wherein said paddles include wiping edges oriented to become substantially horizontal when moving past said upwardly positioned opening means for sweeping the poultry carcasses out of the discharge space.

3. The post chill decontamination tank assembly of claim 1 and further including a liquid circulation means in fluid communication with said tank for providing a turbulence of the liquid solution in said tank and about the poultry carcasses.

4. The post chill decontamination tank assembly of claim 1 wherein said paddles are revolved at a rate between one half revolution and one revolution per minute.

5. The post chill decontamination tank assembly of claim 1 wherein said plurality of paddles comprises four paddles positioned at intervals of 90° about the central axis within said paddle chamber.

6. The post chill decontamination tank assembly of claim 1 wherein said paddles define openings there through for the circulation of the decontamination solution about the poultry carcasses in contact with the paddles.

7. The post chill decontamination tank assembly of claim 6 wherein the paddles are revolved at a rate between one half revolution and one revolution per minute.

8. The post chill decontamination tank assembly of claim 1 wherein the paddles are revolved at a rate between one half revolution and one revolution per minute.

9. The post chill decontamination tank assembly of claim 1 wherein the plurality of paddles comprises four paddles positioned at intervals of 90° about the central axis within said chamber.

10. A post chill decontamination tank assembly for decontaminating poultry carcasses received from a poultry chiller in which the poultry carcasses were immersed in an antimicrobial-bearing liquid, said post chill decontamination tank assembly comprising:

a tank of smaller liquid capacity than said poultry chiller for holding liquid, said tank including a substantially flat exit wall and a semicircular perimeter side wall, upper opening means for receiving the poultry carcasses in said tank and for discharging the poultry carcasses from said tank, means connected to said tank for supplying to said tank an antimicrobial-bearing liquid of different antimicrobial content than the liquid in the poultry chiller, a plurality of paddles mounted in said tank and displaced radially outwardly from a central axis within said tank and movable in sequence adjacent said exit wall about said upper opening means for discharging the poultry carcasses from said tank, said paddles each including a substantially rectilinear edge arranged to move in close proximity to said exit wall and oriented to pass said opening means with said rectilinear edge oriented substantially horizontally and the paddle sloped toward said opening means for moving the poultry carcasses through said opening means, power means connected to said plurality of paddles for revolving said plurality of paddles about the central axis in said tank and in sequence past the opening means of the tank for urging poultry carcasses in sequence about the tank and toward the opening means.

11. A post chill decontamination tank assembly for positioning at a carcass discharge end of a poultry chiller that contains a liquid solution for decontaminating poultry carcasses, said post chill decontamination tank assembly comprising:

a tank for receiving the poultry carcasses from the poultry chiller, said tank including an entrance wall, an exit wall opposed to said entrance wall, and a perimeter wall extending between said entrance wall and said exit wall and defining a chamber for containing a decontamination solution, said tank including an upwardly positioned opening and an entrance space for receiving poultry carcasses from the poultry chiller into the tank and a discharge space for discharging the poultry carcasses from the tank, a paddle assembly including a plurality of paddles mounted in said chamber about a central axis within said chamber and positioned at different angles about the central axis, power means connected to said paddle assembly for revolving said plurality of paddles in unison about the central axis in said tank, said paddles configured for gathering poultry carcasses as the plurality of paddles revolve in said tank, a partition in said tank adjacent said plurality of paddles and forming in said tank an entrance chamber for receiving poultry carcasses, the partition including a lower edge positioned above the lower portion of said tank to allow poultry carcasses to pass from the entrance chamber to the plurality of paddles, such that the poultry carcasses are received in the entrance chamber and contacted by the liquid in the tank before being engaged by the paddles.

12. The post chill decontamination tank assembly of claim 11, and further including a liquid circulation means for directing liquid beneath the partition and urging the carcasses beneath the partition and toward the paddles.

13. The post chill decontamination tank assembly of claim 11 and further including a second set of paddles configured to move poultry carcasses toward said plurality of paddles.

14. The post chill decontamination tank assembly of claim 13, wherein said power means is connected to said second set of paddles for revolving said second set of paddles about the central axis in said tank in a direction opposite to the direction of rotation of said plurality of paddles.

15. The post chill decontamination tank assembly of claim 11, and further including an auger in said tank, said auger configured for feeding poultry carcasses to said plurality of paddles.

16. A process of decontaminating poultry carcasses that have been moved through a liquid chiller containing a liquid solution for decontaminating the poultry carcasses, comprising:

moving the poultry carcasses out of the liquid chiller and into an entrance chamber of a post chill decontamination tank filled with a decontamination solution different than the liquid in the liquid chiller, revolving a paddle assembly about a central axis in the tank with the paddles of the paddle assembly arranged at substantially equal angles from each other about the central axis, moving the poultry carcasses from the entrance chamber beneath a partition in the tank and toward the paddles, engaging and moving the poultry carcasses with the paddles through the liquid upwardly above the liquid and out of the tank.

17. The process of claim 16, and including moving the poultry carcasses with a stream of antimicrobial-bearing liquid beneath the partition and toward the paddles.

18. The process of claim 16, and including moving the poultry carcasses with an auger toward the paddles.

19. The process of claim 16, including moving antimicrobial liquid beneath the partition in the tank and urging the carcasses with the moving liquid beneath the partition and toward the paddles.

20. A post chill decontamination tank assembly for positioning at a carcass discharge end of a poultry chiller and for decontaminating poultry carcasses, said post chill decontamination tank assembly comprising:

a tank for receiving the poultry carcasses from the poultry chiller, said tank including an entrance wall, an exit wall opposed to said entrance wall, and a perimeter wall extending between said entrance wall and said exit wall and defining a chamber for containing a decontamination solution, said tank including a partition positioned between said entrance wall and said exit wall and dividing said tank into a bird entrance chamber and a paddle chamber, and an upwardly positioned opening means for receiving poultry carcasses from the poultry chiller into said bird entrance chamber and for discharging the poultry carcasses from said paddle chamber, a paddle assembly including a plurality of paddles mounted in said paddle chamber about a central axis within said paddle chamber and positioned at different angles about the central axis, power means connected to said paddle assembly for revolving said plurality of paddles in unison about the central axis in said paddle chamber, said paddles configured for gathering poultry carcasses as the plurality of paddles revolve in said tank.

21. The post chill decontamination tank assembly of claim 20 and further including a liquid circulation means in fluid communication with said tank for providing a turbulence of the liquid solution in the tank and about the poultry carcasses.

* * * * *